UNITED STATES PATENT OFFICE.

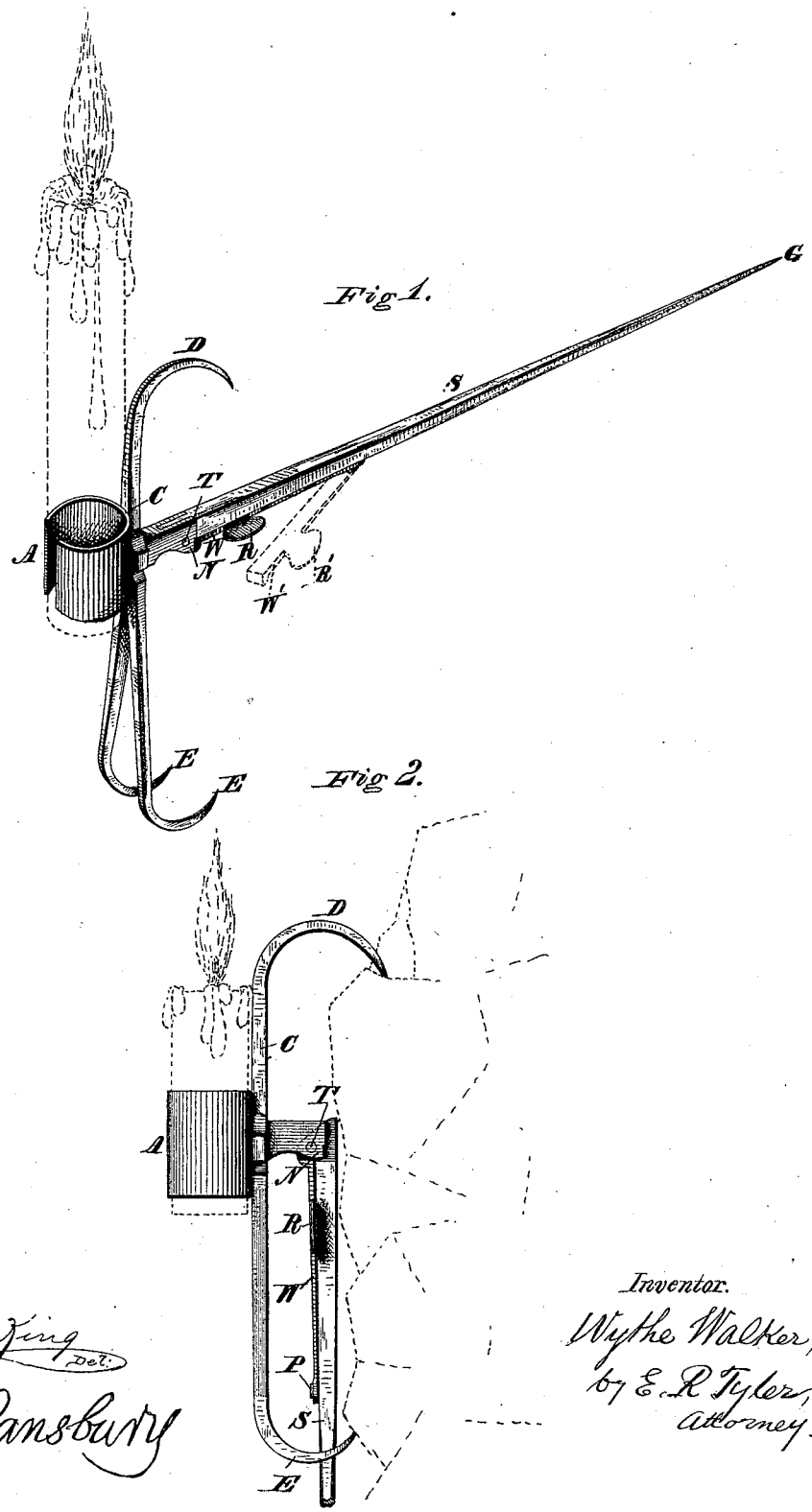

WYTHE WALKER, OF BEAVER, UTAH TERRITORY.

IMPROVEMENT IN CANDLE-HOLDERS FOR MINERS' USE.

Specification forming part of Letters Patent No. 194,940, dated September 4, 1877; application filed July 30, 1877.

*To all whom it may concern:*

Be it known that I, WYTHE WALKER, of Beaver, in the county of Beaver and Territory of Utah, have invented a new and useful Improvement in Candle-Holders, of which the following is a full and correct description, reference being had to the accompanying drawings, in which—

Figure 1 is a perspective view, exhibiting the spear in position for use as a support; and Fig. 2 is a side elevation, exhibiting the candle-holder hanging by its hook upon a rocky wall.

This candle-holder is especially intended for use by miners and workmen in mines and similar places. For this purpose it combines, in a compact and convenient form, two modes of supporting the candle-holder—viz: first, of a spear, which may be driven into a wall or timber; and, second, a hook, by which to hang up the candle-holder, the whole being so arranged that neither contrivance interferes with the other when in use. Each of these ways of supporting the candle-holder is useful in a mine, and frequently only one of them is practicable. In case of a timber, or when the wall is of such a character as to admit and hold the spear, the spear may be used; but when the wall is rocky, the spear may be folded away and the candle-holder hung by its hook at a crevice in the wall or elsewhere, lateral tilting being prevented by the two feet, one on each side below.

The construction and operation of this candle-holder are clearly shown in the drawings, and may be further explained by reference to them, the same letter of reference indicating the same part wherever it occurs.

A is the tube or socket for receiving the candle. At B, on the outside of the socket A, there is firmly fastened the stem C of the hook D, by which the candle-holder may be hung up.

Below the fastening B the stem C is split, and descends in two parts like an inverted V. Each part, at a convenient and equal distance from the fastening B, and somewhat farther therefrom than the hook D is, turns backward and upward, forming a hook, E, having a curve somewhat less than that of the hook D.

The two hooks E E by their shape and position add to the steadiness of the candlestick when hanging; at the same time they afford a place between them for the spear to lie when folded.

This spear S is firmly fastened to the tube or socket A at the point where it passes through the hook-stem C. It extends to a convenient distance in a line at right angles to the axis of the tube A. It is pointed at the end G for more convenient use.

Near its point of union with the socket the spear S is broken by a hinge, T. Upon this hinge the spear S turns, so as to hang down between the hooks E E, and thus be out of the way when the candle-holder is hung up.

When the spear is bent back into a straight position it is caught upon the shoulder N, and retained in that position by the spring W. This spring is a flat slip of metal, lying along the under surface of the spear, and fastened to it by a pin, P, upon which it turns to one side or the other of the spear in obedience to pressure upon the thumb-piece R.

In Fig. 1 the spring W is represented holding the spear in place by preventing the hinge bending; and again, in dotted lines W', as it would appear pushed to one side, so as to allow the spear to fall and take the position shown in Fig. 2, where the spring is represented as having been pushed back into place along the under side of the spear.

Upon raising the spear from the position shown in Fig. 2 to that shown in Fig. 1 the spring W would of itself take the position shown in Fig. 1 and prevent the return of the spear.

The candle-holder is made of iron and steel or other suitable metal or material.

Having thus described my invention, I claim as new and desire to secure by Letters Patent—

1. The combination, in a candle-holder, of the socket A and the spear S, having the hinge-joint T and the spring W, as set forth.

2. The combination, in a candle-holder, of the socket A, the spear S, hinge T, and spring W, and the hooks, as set forth.

WYTHE WALKER.

Witnesses:
S. S. PATTERSON,
ROBT. HARKNESS.